(12) United States Patent
Schneider et al.

(10) Patent No.: US 7,204,516 B2
(45) Date of Patent: Apr. 17, 2007

(54) TELESCOPE WEDGE LOCKING MECHANISM

(75) Inventors: Douglas M. Schneider, Saginaw, MI (US); Kurt J. Hilbrandt, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 332 days.

(21) Appl. No.: 10/859,273

(22) Filed: Jun. 2, 2004

(65) Prior Publication Data

US 2005/0269811 A1   Dec. 8, 2005

(51) Int. Cl.
*B62D 1/11* (2006.01)
(52) U.S. Cl. ..................................... 280/777
(58) Field of Classification Search ................ 280/777; 74/492, 493
See application file for complete search history.

(56) References Cited

U.S. PATENT DOCUMENTS

| | | | |
|---|---|---|---|
| 2,218,841 A | 10/1940 | Bluemel et al. | 74/493 |
| 3,338,607 A | 8/1967 | Broadhurst et al. | 287/58 |
| 3,491,614 A * | 1/1970 | Saunders et al. | 74/493 |
| 3,570,322 A | 3/1971 | Krouse | 74/493 |
| 3,962,931 A | 6/1976 | Moneta | 74/493 |
| 5,113,716 A | 5/1992 | Dumschat et al. | 74/493 |
| 6,354,626 B1 | 3/2002 | Cartwright | 280/777 |
| 6,419,269 B1 | 7/2002 | Manwaring et al. | 280/775 |
| 6,616,185 B2 | 9/2003 | Manwaring et al. | 280/775 |

FOREIGN PATENT DOCUMENTS

EP   0611690   5/1997

* cited by examiner

*Primary Examiner*—Faye M. Fleming
(74) *Attorney, Agent, or Firm*—Michael D. Smith

(57) ABSTRACT

The present invention provides an apparatus for selectively preventing the collapse of a collapsible steering column of a vehicle. The invention includes a first steering column member defining first and second opposing surfaces that are fixedly spaced relative to one another. The invention also include a second steering column member connected to the first steering column member for sliding movement The second steering column member defines a third surface opposing and spaced from the first surface. The invention also includes a wedging member selectively moveable between the first and second surfaces for being selectively compressible between the first and third surfaces to limit the sliding movement. The invention selectively prevents the collapse of the steering column.

18 Claims, 4 Drawing Sheets

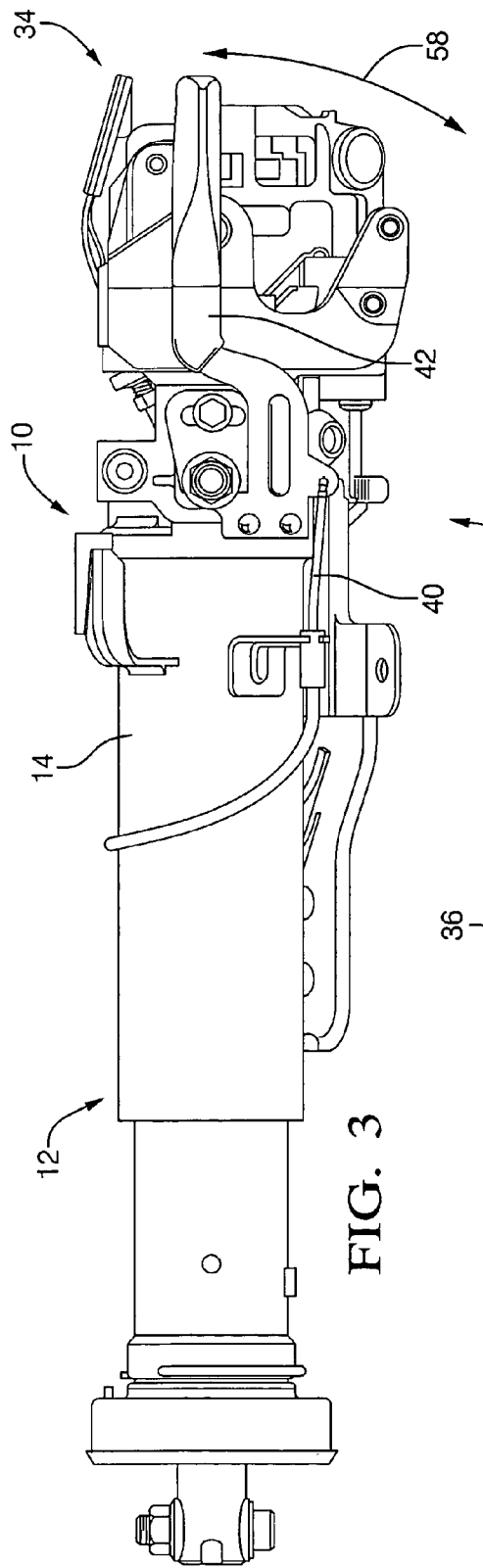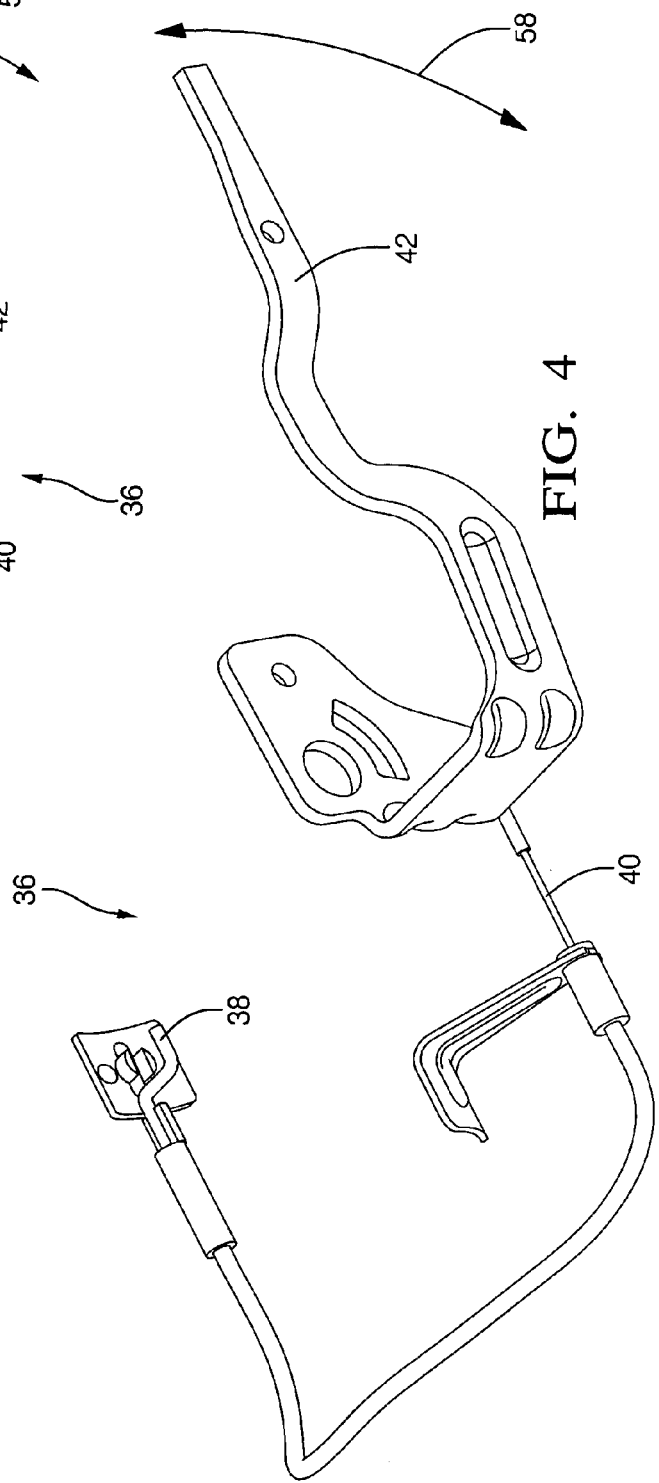
FIG. 3
FIG. 4

TELESCOPE WEDGE LOCKING MECHANISM

FIELD OF THE INVENTION

The invention relates to a telescoping mechanism having first and second telescoping members and in an exemplary embodiment provides an apparatus for preventing the collapse of a collapsible steering column.

BACKGROUND OF THE INVENTION

Telescoping arrangements are used in a wide variety of applications. Vehicles often include telescoping steering columns to enhance the range of adjustment of the steering wheel in the vehicle. Telescoping steering columns include first and second members that slide relative to one another. When used in combination with raking or tilting adjustment structures, telescoping steering columns allow for a wide range of positions for the steering wheel in the vehicle to accommodate the preferences of a wide range of drivers.

Telescoping steering columns can also include devices or mechanisms that prevent the collapse of the telescoping steering column. Collapse of the telescoping steering column refers to the movement of the first and second members closer to one another. During an impact situation such as a vehicle crash, the telescoping steering column may collapse if the driver is propelled against the steering wheel.

SUMMARY OF THE INVENTION AND ADVANTAGES

The present invention provides an apparatus for selectively preventing the collapse of first and second telescoping members. In the exemplary embodiment of the invention, the apparatus prevents the collapse of a collapsible steering column of a vehicle. The apparatus includes a first steering column member defining first and second opposing surfaces that are fixedly spaced relative to one another. The apparatus also include a second steering column member connected to the first steering column member for sliding movement The second steering column member defines a third surface opposing and spaced from the first surface. The apparatus also includes a wedging member selectively moveable between the first and second surfaces for being selectively compressible between the first and third surfaces to limit the sliding movement. The exemplary apparatus of the invention selectively prevents the collapse of the steering column.

The invention provides a telescoping locking feature that is undetectable by the occupant during telescopic adjustment of the steering column. In other words, the invention does not impact the loads, tactiles, or noise that the occupant observes during telescopic adjustment of the steering column. The invention resists telescopic movement only when desired.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a side view of the first exemplary embodiment;

FIG. 4 is a perspective view of a moving device according to the first exemplary embodiment;

DETAILED DESCRIPTION OF THE PREFERRED EMBODIMENT

Figure 1:
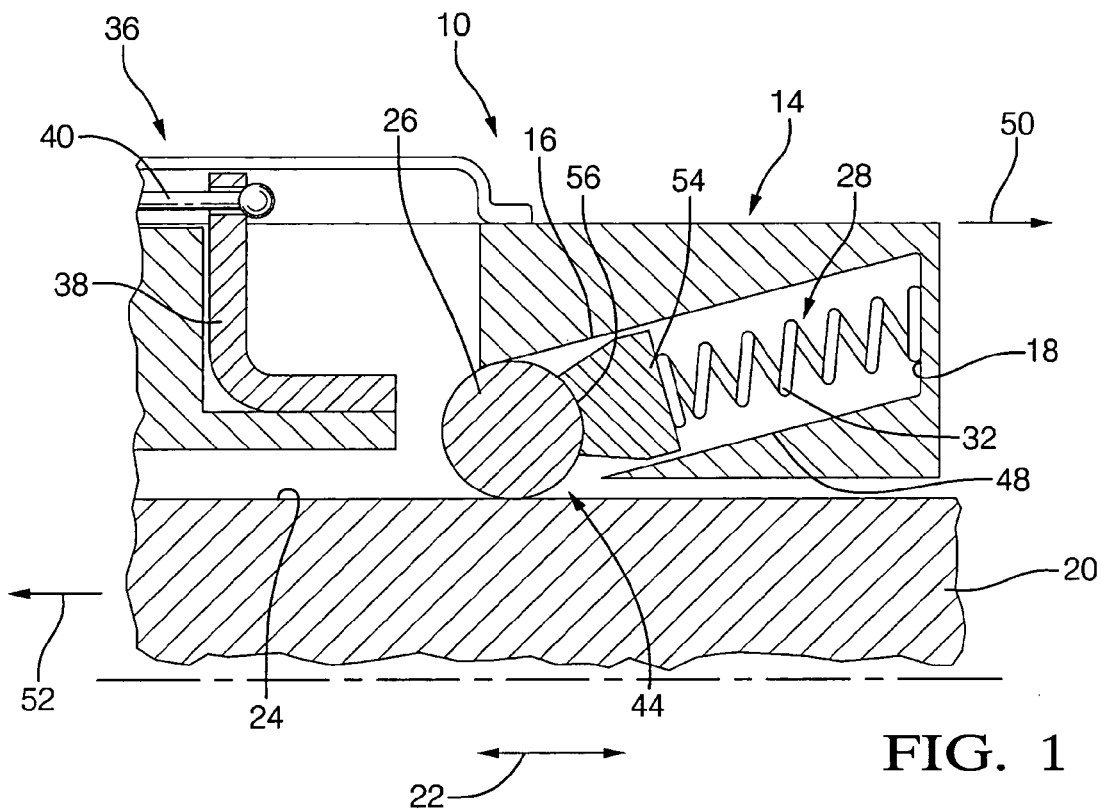
FIG. 1 is a cross-sectional view of a first exemplary embodiment of the invention wherein a wedging member is in a first position to be compressed between first and third surfaces.

Referring now to FIGS. 1–4, in a first exemplary embodiment of the invention, an apparatus 10 selectively prevents the collapse of a collapsible steering column 12. The apparatus 10 includes a first steering column member 14 defining first and second opposing surfaces 16, 18 that are fixedly spaced relative to one another. The apparatus 10 includes a steering wheel supporting portion 34 for supporting a steering wheel. The second surface 18 is disposed closer to the steering wheel supporting portion 34 than the first surface 16. The first steering column member 14 can be a single member defining both of the first and second opposing surfaces 16, 18 or can be two separate members fixedly associated with one another wherein one of the members defines the first surface 16 and the other member defines the surface 18.

The apparatus 10 also includes a second steering column member 20 connected to the first steering column member 14 for sliding movement 22. The second steering column member 20 defines a third surface 24 that opposes and is spaced from the first surface 16. The apparatus 10 also includes a wedging member 26 selectively movable between the first and second surfaces 16, 18 for being selectively compressible between the first and third surfaces 16, 24 to limit the sliding movement 22.

Figure 2:
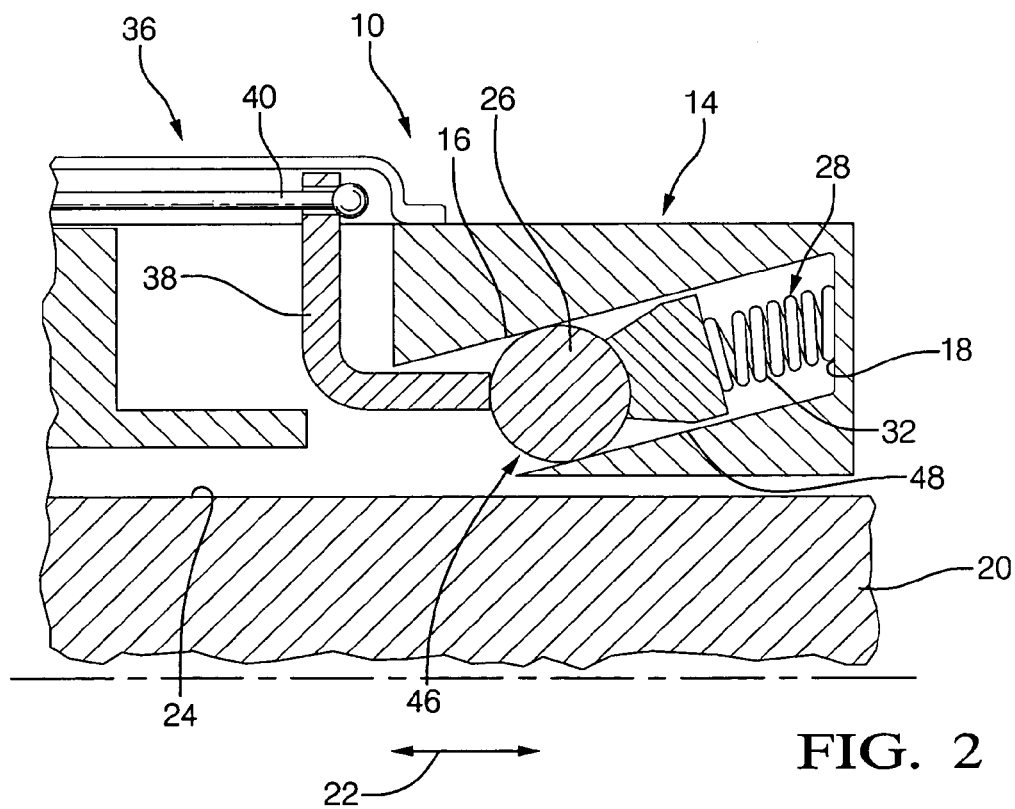
FIG. 2 is a cross-sectional view of the first exemplary embodiment wherein the wedging member is in a second position spaced closer to a second surface than the first position.

The wedging member 26 is movable between the first and second surfaces 16, 18 along a path extending between a first position 44, best shown in FIG. 1, and a second position 46, best shown in FIG. 2. The wedging member 26 contacts the first and third surfaces 16, 24 when in the first position 44. The wedging member 26 is spaced closer to the second surface 18 when in the second position 46, relative to the first position 44.

In the first exemplary embodiment, the first steering column member 14 is an outer steering column jacket and the second steering column member 20 is an inner steering column jacket. However, in alternative embodiments of the invention, the first steering column member 14 could be an inner steering column jacket and the second steering column member 20 could be an outer steering column jacket. Furthermore, the first and second steering column members 14, 20 could be upper and lower steering column jackets or brackets.

In operation, the first and second steering column members 14, 20 collapse with respect to one another when the first steering column member 14 moves in a first direction 50 along the path of sliding movement 22 and/or the second steering column member 20 moves in a second direction 52. In alternative embodiments of the invention, only one of the first and second steering column members 14, 20 may move.

When in the first position 44, the wedging member 26 is urged in the second direction 52 in response to the collapsing sliding movement 22. The distance between the first surface 16 and the third surface 24 decreases in the second direction 52 and is less than the diameter of the wedging member 26 at the first position 44. As a result, with increasing collapsing movement, the cooperation between the first steering column member 14, the wedging member 26, and the second steering column member 20 will result in increasing forces directed in a normal direction from the path of sliding movement 22. The forces act on both the first steering column member 14 and the second steering column member 20. The normal forces increase the static frictional resistance between the first and second steering column members 14, 20 and substantially prevent the collapse of the steering column 12.

The wedging member 26 is movably associated with both of the first and second steering column members 14, 20. The wedging member 26 defines a circular cross section. In alternative embodiments of the invention, the wedging member 26 could be square or ramp-shaped. In the first exemplary embodiment, the wedging member 26 is spherical. The wedging member 26 is spaced from at least one of the first surface 16 or the third surface 24 at the second position 46. In the first exemplary embodiment, the first steering column member 14 defines a fourth surface 48 facing away from the third surface 24. The wedging member 26 contacts the fourth surface 48 at the second position 46.

The apparatus 10 also includes a biasing device 28 urging the wedging member 26 toward one of the first or second surfaces 16, 18. In the first exemplary embodiment, the biasing device 28 includes a spring 32 that is disposed between the second surface 18 and the wedging member 26. The spring 32 urges the wedging member 26 towards the first position 44 and against the first surface 16 and the third surface 24. In an alternative embodiment of the invention, the spring 32 could have a low spring rate and could urge the wedging member 26 away from the first position 44. In such an embodiment, in the event of an impact situation such as a crash, the momentum of the wedging member 26 would carry the wedging member 26 to the first position 44 and overcome the spring rate of the spring 32.

The biasing device 28 also includes an aligning member 54 disposed between the spring 32 and the wedging member 26. The aligning member 54 defines a surface 56 that corresponds to an outer surface of the wedging member 26. The aligning member 54 substantially reduces the likelihood that the wedging member 26 and the springs 32 will become disengaged with respect to one another.

The apparatus 10 also includes a moving device 36 contacting the wedging member 26 and selectively urging the wedging member 26 toward the second surface 18. The moving device 36 includes a pin 38 slidably connected to the first steering column member 14. The pin 38 is connected to a cable 40 and a lever arm 42. The lever arm 42 is pivotally connected to the first steering column member 14 and is movable along an angular path 58. The lever arm 42 can be biased to a first position corresponding to the view shown in FIG. 3.

In the first exemplary embodiment, when the lever arm 42 is in the first position, the pin 38 is disposed as shown in FIG. 1. The cable 40 moves in response to movement of the lever arm 42 along the angular path 58. As the lever arm 42 moves along the angular path 58, the pin 38 is moved by the cable 40 from the position shown in FIG. 1 to the position shown in FIG. 2 to move the wedging member 26 from the first position 44 to the second position 46. The lever arm 42 can be operated by the driver of the vehicle when telescoping adjustment of the steering column 12 is desired. After the steering column 12 has been adjusted, the lever arm 42 returns to the biased position and the wedging member 26 is returned to the first position 44. In alternative embodiments of the invention, the pin 38 can be moved using other mechanical devices or electro-mechanical devices. For example, the pin 38 can be moved with an electric motor or a solenoid.

Additionally, the movement of the pin 38 can be communicated to another motor or controller in the vehicle, such as a controller for controlling telescoping movement of the steering column 12. For example, in a vehicle including a motor for telescopically adjusting the steering column 12, the controller for the motor can communicate with a controller of the pin 38 such that the motor for telescoping the steering column 12 will not engage unless the pin 38 is in the second position 46 shown in FIG. 2.

Figure 5:
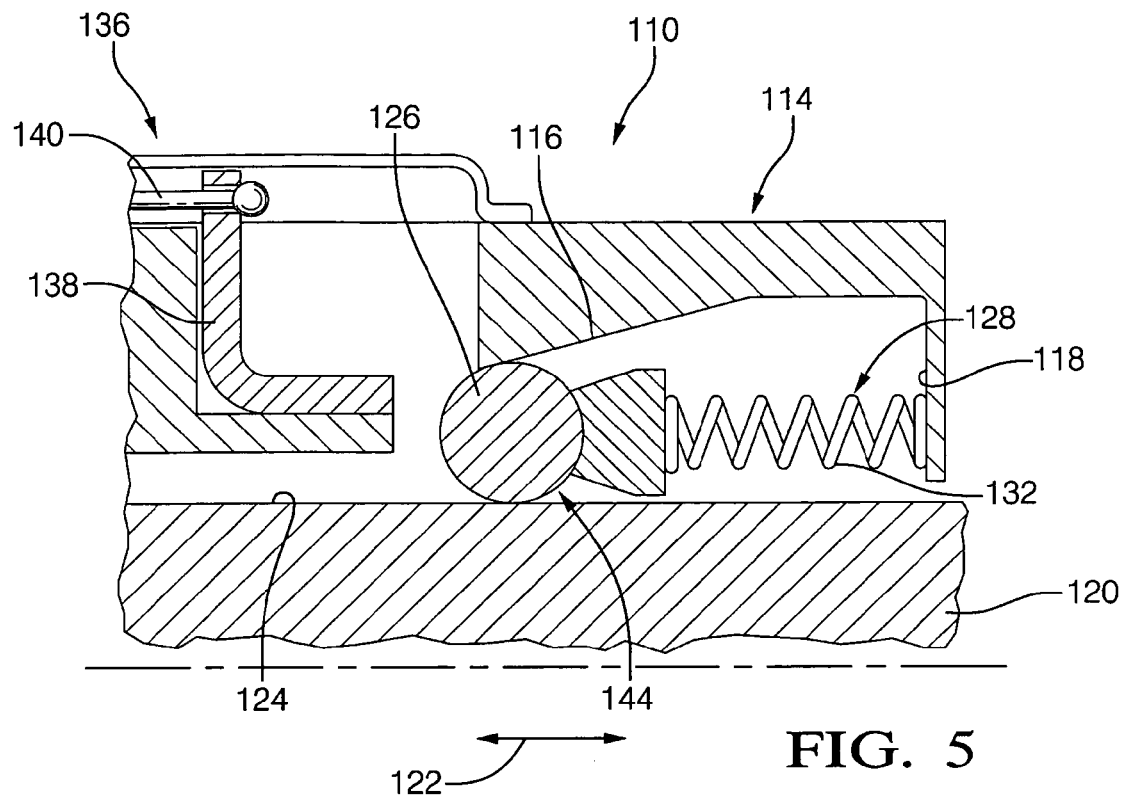
FIG. 5 is a cross-sectional view of a second exemplary embodiment of the invention wherein a wedging member is in a first position to be compressed between first and third surfaces.
Figure 6:
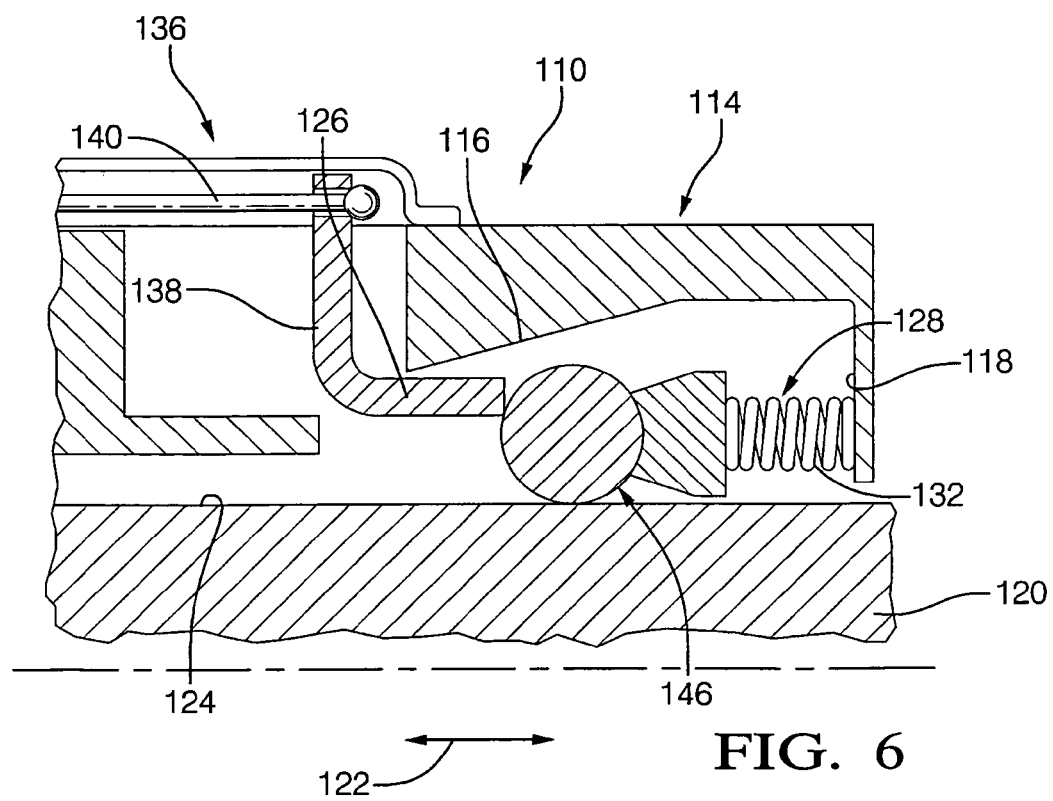
FIG. 6 is a cross-sectional view of the second exemplary embodiment wherein the wedging member is in a second position spaced closer to a second surface than the first position.

Referring now to FIGS. 5 and 6, in a second exemplary embodiment of the invention, an apparatus 110 includes a first steering column member 114 defining first and second opposing surfaces 116, 118 fixedly spaced relative to one another. The first steering column member 114 is an outer steering column jacket. The apparatus 110 also includes a second steering column member 120 connected to the first steering column member 114 for sliding movement 122. The second steering column member 122 defines a third surface 124 opposing and spaced from the first surface 116. The apparatus 110 also includes a wedging member 126 selectively movable between the first and second surfaces 116, 118 for being selectively compressible between the first and third surfaces 116, 124 to limit the sliding movement 122.

The wedging member 126 is movable between the first and second surfaces 116, 118 along a path extending between a first position 144 and a second position 146. The wedging member 126 contacts the first and third surfaces 116, 124 at the first position 144. The wedging member 126 is spaced closer to the second surface 118 at the second position 146 relative to the first position 144. Also, the wedging member 126 is spaced from at least one of the first surface 116 and the third surface 124 at the second position 146. In the second exemplary embodiment, the wedging member 126 is spaced from the first surface 116 at the second position 146. The wedging member 126 defines a circular cross-section and, more particularly, is spherical.

The apparatus 110 includes a biasing device 128 urging the wedging member 126 toward the first surface 116. The biasing device 128 includes a spring 132 disposed between the second surface 118 and the wedging member 126. The spring 132 urges the wedging member 126 toward the first position 144.

The apparatus 110 also includes a moving device 136 contacting the wedging member 126 and selectively urging the wedging member 126 toward the second surface 118. The moving device 136 includes a pin 138 slidably connected to the first steering column member 114 and a cable 140. The operation of the apparatus 110 is substantially similar to the operation of the apparatus 10 shown in FIGS. 1–4.

Figure 7:
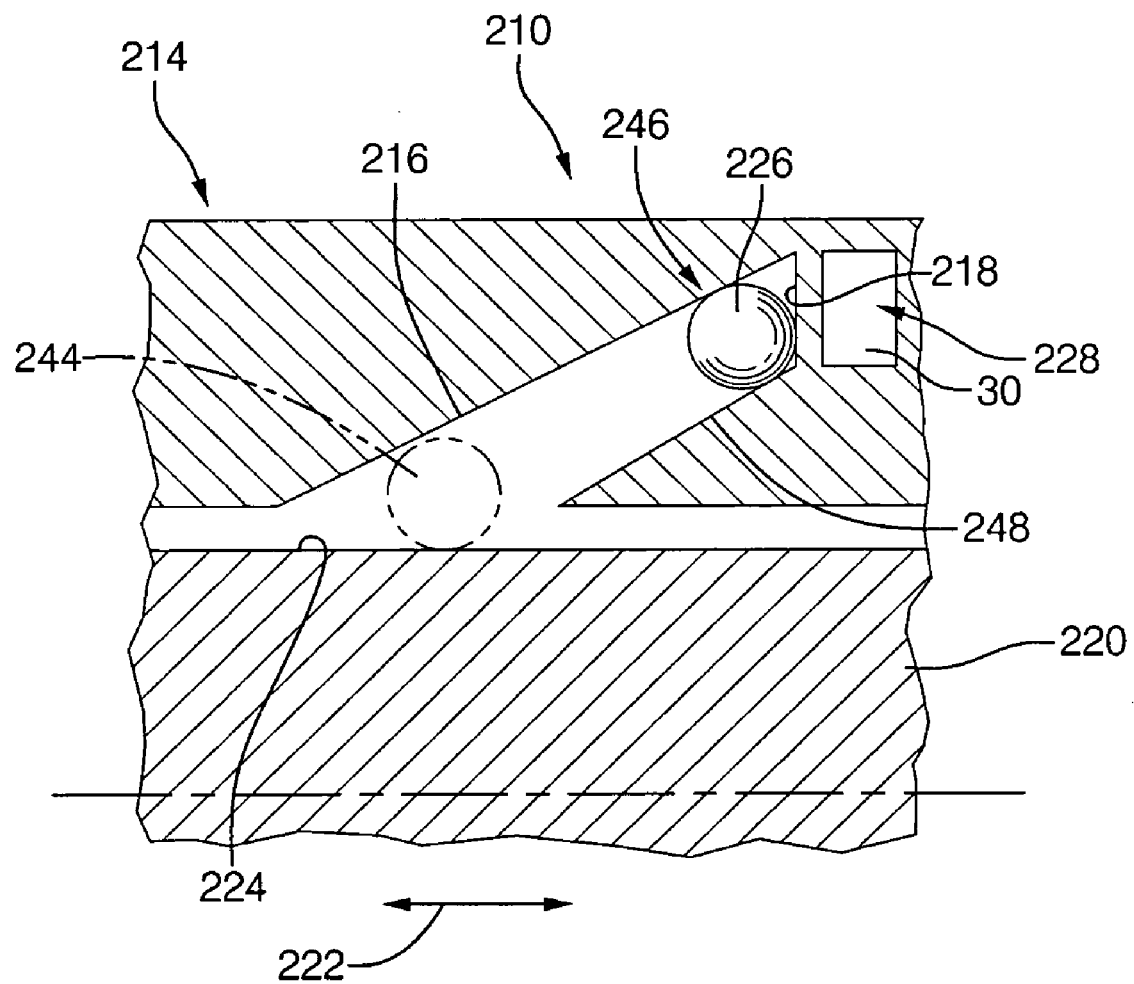
FIG. 7 is a cross-sectional view of a third exemplary embodiment wherein the wedging member is shown in a first position in phantom and shown in solid line in a second position.

Referring now to FIG. 7, in a third exemplary embodiment of the invention, an apparatus 210 includes a first steering column member 214 defining first and second opposing surfaces 216, 218 fixedly spaced relative to one another. The apparatus 210 also includes a second steering column member 220 connected to the first steering column member 214 for sliding movement 222. The second steering column member 220 defines a third surface 224 opposing and spaced from the first surface 216. The apparatus 210 also includes a wedging member 226 selectively movable between the first and second surfaces 216, 218 for being selectively compressible between the first and third surfaces 216, 224 to limit the sliding movement 222.

The wedging member 126 is movable between the first and second surfaces 216, 218 along a path extending between a first position 244 (shown in phantom) and a second position 246 (shown in solid line). The wedging member 226 contacts the first and third surfaces 216, 224 at the first position 244. The wedging member 126 is spaced closer to the second surface 218 at the second position 246 relative to the first position 244. The first steering column member 214 defines a fourth surface 248 facing away from the third surface 224. The wedging member 226 contacts the fourth surface 248 at the second position 246.

The apparatus 210 also includes a biasing device 228 urging the wedging member 226 toward the first surface 216. In the third exemplary embodiment, the wedging member 226 is metallic and the biasing device 228 includes a magnet 30. The magnet 30 emits a magnetic field of predetermined strength attracting the wedging member 226 for maintaining the wedging member 226 in the second position 246 during normal vehicle handling. In an impact situation such as a vehicle crash, the wedging member 226 will be propelled forward by momentum to the first position 244. In other words, the momentum of the wedging member 226 will overcome the strength of the magnet field generated by the magnet 30 and the wedging member 226 will separate from the surface 218.

In operation, a driver of a vehicle can control the lever arm 42 to move along the angular path 58 and adjust the telescopic position of the steering column 12. When the driver moves the lever arm 42 in a first direction along the angular path 58, the pin 38 engages the wedging member 26 and urges the wedging member 26 to the second position 46, best shown in FIG. 2. When the wedging member 26 is in the second position 46, the steering column 12 can be telescopically adjusted.

After the steering column 12 has been adjusted as desired, the driver moves the lever arm 42 along the angular path 58 in a second direction and the pin 38 moves to a retracted position, shown in FIG. 1. In the event of an impact situation such as a vehicle crash, the driver may be thrust against the steering column 12, directing an impact force to the second steering column member 20 in the direction 52. Movement of the second steering column member 20 in the direction 52 tends to urge the wedging member 26 in the direction 52. Furthermore, as the wedging member 26 moves in the direction 52, the frictional force between the second steering column member 20 and the wedging member 26 increases and also the frictional force between the first steering column member 14 and the wedging member 26 increases. The wedging member 26 tends to be compressed between the first steering column member 14 and the second steering column member 20 in response to movement of the second steering column member 20 in the direction 52.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for selectively preventing the collapse of a collapsible steering column of a vehicle comprising:
   a first steering column member defining first and second opposing surfaces fixedly spaced relative to one another;
   a second steering column member connected to said first steering column member for sliding movement and defining a third surface opposing and spaced from said first surface;
   a wedging member selectively moveable between said first and second surfaces for being selectively compressible between said first and third surfaces to limit said sliding movement; and
   a biasing device bearing between said first and second surfaces for urging said wedging member toward one of said first or second surfaces.

2. The apparatus for selectively preventing the collapse of a collapsible steering column of a vehicle comprising:
   a first steering column member defining first and second opposing surfaces fixedly spaced relative to one another;
   a second steering column member connected to said first steering column member for sliding movement and defining a third surface opposing and spaced from said first surface;
   a wedging member selectively moveable between said first and second surfaces for being selectively compressible between said first and third surfaces to limit said sliding movement;
   a biasing device urging said wedging member toward one of said first or second surface; and
   wherein said wedging member is metallic and said biasing device includes a magnet.

3. The apparatus of claim 2 wherein said magnet emits a magnetic field of predetermined strength attracting said wedging member for maintaining the wedging member in a desired position during normal vehicle handling.

4. The apparatus of claim 3 wherein said magnet is associated with said second surface.

5. The apparatus of claim 1 wherein said biasing device includes a spring.

6. The apparatus of claim 5 wherein said spring is disposed between said second surface and said wedging member.

7. The apparatus of claim 6 wherein said spring urges said wedging member against said first surface.

8. The apparatus of claim 1 wherein said first steering column member is further defined as an outer steering column jacket.

9. The apparatus of claim 1 wherein one of said first and second steering column members defines a steering wheel supporting portion and said second surface is disposed closer to said steering wheel supporting portion than said first surface.

10. The apparatus of claim 1 wherein said wedging member defines a circular cross-section.

11. The apparatus of claim 10 wherein said wedging member is spherical.

12. The apparatus of claim 1 including a moving device contacting said wedging member and selectively urging said wedging member toward said second surface.

13. The apparatus of claim 12 wherein said moving device includes a pin slidably connected to said first steering column member.

14. The apparatus of claim 13 including a cable and a lever arm wherein said lever arm is pivotally connected to said first steering column member and said cable extends between said lever arm and said pin.

15. The apparatus of claim 1 wherein said wedging member is movable between said first and second surfaces along a path extending between a first position wherein said wedging member contacts said first and third surfaces to a second position spaced closer to said second surface than said first position.

16. The apparatus of claim 15 wherein said wedging member is spaced from one of said first surface or said third surface at said second position.

17. The apparatus of claim 15 wherein said first steering column member defines a fourth surface facing away from said third surface and said wedging member contacts said fourth surface at said second position.

18. An apparatus for selectively preventing the collapse of a collapsible steering column of a vehicle comprising:

a first steering column member defining first and second opposing surfaces fixedly spaced relative to one another;

a second steering column member connected to said first steering column member for sliding movement and defining a third surface opposing and spaced from said first surface;

a wedging member selectively moveable between said first and second surfaces for being selectively compressible between said first and third surfaces to limit said sliding movement, wherein said wedging member is movable between said first and second surfaces along a path extending between a first position wherein said wedging member contacts said first and third surfaces to a second position spaced closer to said second surface than said first position;

a biasing device urging said wedging member toward said first surface; and a moving device contacting said wedging member and selectively urging said wedging member against said biasing device and away from said first surface.

* * * * *